(12) United States Patent
Liu et al.

(10) Patent No.: US 10,220,958 B2
(45) Date of Patent: Mar. 5, 2019

(54) METHOD, APPARATUS AND COMPUTER-READABLE MEDIUM FOR LANDING FLIGHT DEVICE

(71) Applicant: Beijing Xiaomi Mobile Software Co., Ltd., Haidian District, Beijing (CN)

(72) Inventors: Huayijun Liu, Beijing (CN); Tao Chen, Beijing (CN); Ke Wu, Beijing (CN)

(73) Assignee: BEIJING XIAOMI MOBILE SOFTWARE CO., LTD., Haidian District, Beijing (*) Notice: Subject to any disclaimer, the term of this patent is extended or adjusted under 35 U.S.C. 154(b) by 41 days.

(21) Appl. No.: 15/465,613

(22) Filed: Mar. 22, 2017

(65) Prior Publication Data

US 2017/0341775 A1 Nov. 30, 2017

(30) Foreign Application Priority Data

May 31, 2016 (CN) .......................... 2016 1 0378220

(51) Int. Cl.
*B64D 45/08* (2006.01)
*B64D 47/08* (2006.01)
(Continued)

(52) U.S. Cl.
CPC ............ *B64D 45/08* (2013.01); *B64C 39/028* (2013.01); *B64D 47/08* (2013.01); *G05D 1/0676* (2013.01);
(Continued)

(58) Field of Classification Search
CPC ...... B64D 45/08; B64D 47/08; B64C 39/028; G05D 1/0055; G05D 1/0676; G05D 1/101; G08G 5/069; G08G 5/025
(Continued)

(56) References Cited

U.S. PATENT DOCUMENTS

2005/0125142 A1* 6/2005 Yannane ................ G01C 11/00
701/510
2006/0167622 A1* 7/2006 Bodin .................... G05D 1/104
701/467
(Continued)

FOREIGN PATENT DOCUMENTS

CN 102620736 A 8/2012
CN 104007766 A 8/2014
(Continued)

OTHER PUBLICATIONS

International Search Report of No. PCT/CN2016/097587 dated Mar. 6, 2017.
(Continued)

*Primary Examiner* — Yazan A Soofi
(74) *Attorney, Agent, or Firm* — Jun He Law Offices P.C.; James J. Zhu

(57) ABSTRACT

A method, apparatus and computer-readable medium for landing a flight device are provided. The method includes: detecting whether the flight device meets a condition for landing; detecting whether a current landing area for the flight device is a safe landing area, when the flight device meets the condition for landing, wherein the safe landing area is an area on the ground which enables the flight device to land safely; and adjusting the current landing area for the flight device to the safe landing area, when the current landing area is not the safe landing area.

15 Claims, 5 Drawing Sheets

(51) Int. Cl.
  *B64C 39/02* (2006.01)
  *G05D 1/06* (2006.01)
  *G05D 1/10* (2006.01)
  *G08G 5/00* (2006.01)
  *G08G 5/02* (2006.01)
  *G06K 9/00* (2006.01)

(52) U.S. Cl.
  CPC ....... *G06K 9/00637* (2013.01); *G08G 5/0021* (2013.01); *G08G 5/0069* (2013.01); *G08G 5/025* (2013.01); *B64C 2201/021* (2013.01); *B64C 2201/141* (2013.01)

(58) Field of Classification Search
  USPC ............................................................ 701/17
  See application file for complete search history.

(56) References Cited

U.S. PATENT DOCUMENTS

| | | | | |
|---|---|---|---|---|
| 2007/0138345 | A1* | 6/2007 | Shuster | G05D 1/105 244/186 |
| 2008/0071431 | A1* | 3/2008 | Dockter | B63B 35/50 701/3 |
| 2009/0306840 | A1* | 12/2009 | Blenkhorn | G05D 1/0676 701/16 |
| 2013/0282208 | A1* | 10/2013 | Mendez-Rodriguez | G01S 17/89 701/16 |
| 2014/0142787 | A1* | 5/2014 | Tillotson | G05D 1/101 701/3 |
| 2015/0153740 | A1* | 6/2015 | Ben-Shachar | G05D 1/0676 701/16 |
| 2017/0069214 | A1* | 3/2017 | Dupray | G08G 5/0021 |

FOREIGN PATENT DOCUMENTS

| | | |
|---|---|---|
| CN | 104049641 A | 9/2014 |
| CN | 104898695 | 9/2015 |
| CN | 104932533 A | 9/2015 |
| CN | 105116917 A | 12/2015 |
| CN | 105518559 A | 4/2016 |
| CN | 105599912 A | 5/2016 |
| WO | 2013124852 A1 | 8/2013 |

OTHER PUBLICATIONS

Extended European Search Report of European Application No. 16206441.4 dated Jul. 12, 2017.

Dai Zhong-Xing el al., "Vision-based guidance for mini helical UAV landing", Journal of Guangzhou University (Natural Science Edition), Feb. 28, 2010, pp. 30-32, vol. 9, Issue No. 1, published by Guangzhou University in Guangzhou, China.

* cited by examiner

METHOD, APPARATUS AND COMPUTER-READABLE MEDIUM FOR LANDING FLIGHT DEVICE

CROSS-REFERENCE TO RELATED APPLICATION

This application is based on and claims priority to Chinese Patent Application No. 201610378220.7, filed on May 31, 2016, which is incorporated herein by reference in its entirety.

FIELD

The present disclosure relates to a technical field of intelligent device, and more particularly, to a method, apparatus and computer-readable medium for landing a flight device.

BACKGROUND

With the development of flight devices, flight devices (such as a drone) having a capacity of flight are applied into more and more regions. The flight device having a capacity of flight may land according to a landing instruction issued by a terminal. After receiving the landing instruction, the flight device may land in a landing area. The landing area may be constructed by respective areas where the flight device may land. However, it may be difficult for an operator to recover the flight device, if the landing area for the flight device is an area, such as a roof, a lake, and so on.

SUMMARY

A method, an apparatus and a computer-readable medium for landing a flight device are provided by the present disclosure.

According to a first aspect of embodiments of the disclosure, a method for landing a flight device is provided. The method may include: detecting whether the flight device meets a condition for landing; detecting whether a current landing area for the flight device is a safe landing area, when the flight device meets the condition for landing, wherein the safe landing area is an area on the ground which enables the flight device to land safely; and adjusting the current landing area for the flight device to the safe landing area, when the current landing area is not the safe landing area.

According to a second aspect of embodiments of the disclosure, an apparatus for controlling a flight device is provided. The apparatus may include: a processor; and a memory for storing instructions executable by the processor; wherein the processor is configured to: detect whether the flight device meets a condition for landing; detect whether a current landing area for the flight device is a safe landing area, when the flight device meets the condition for landing, wherein the safe landing area is an area on the ground which enables the flight device to land safely; and adjust the current landing area for the flight device to the safe landing area, when the current landing area is not the safe landing area.

According to a third aspect of embodiments of the disclosure, a non-transitory computer-readable storage medium having instructions stored thereon is provided. The instructions, when executed by a processor, cause the processor to perform a method for controlling a flight device. The method may include: detecting whether the flight device meets a condition for landing; detecting whether a current landing area for the flight device is a safe landing area, when the flight device meets the condition for landing, wherein the safe landing area is an area on the ground which enables the flight device to land safely; and adjusting the current landing area for the flight device to the safe landing area, when the current landing area is not the safe landing area.

It is to be understood that both the forgoing general description and the following detailed description are exemplary and explanatory only, and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which same reference numbers in different drawings represent same or similar elements unless otherwise described. The implementations set forth in the following description of exemplary embodiments do not represent all implementations consistent with the disclosure. Instead, they are merely examples of apparatus and methods consistent with aspects related to the disclosure as recited in the appended claims.

Figure 1:
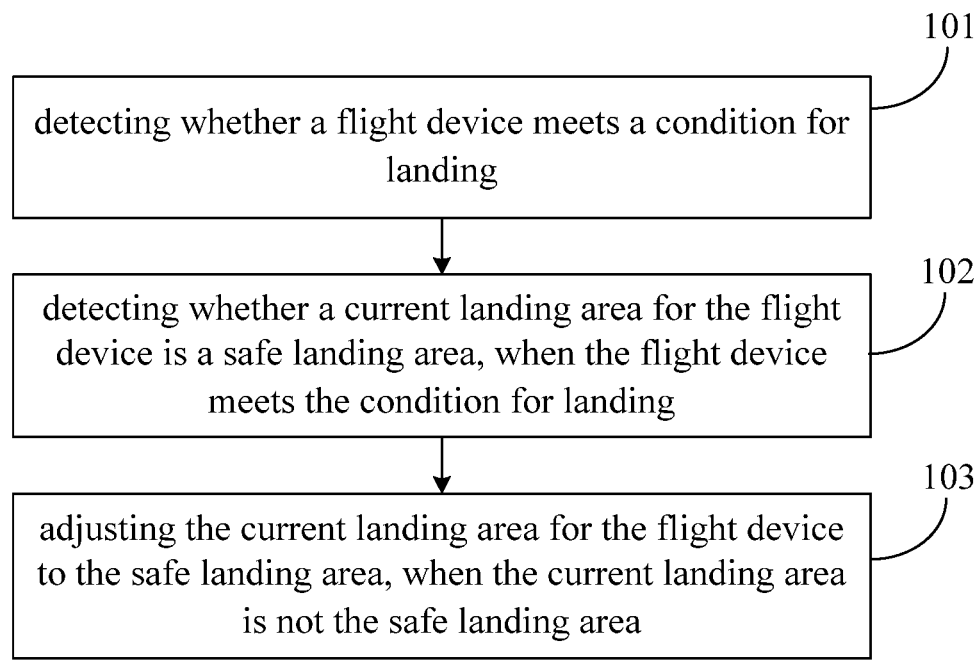
FIG. 1 is a flow diagram illustrating a method for controlling a flight device according to an exemplary embodiment.

FIG. 1 is a flow diagram illustrating a method for controlling a flight device according to an exemplary embodiment. The method for controlling a flight device may be applied to a flight device and may include following steps, as shown in FIG. 1.

In step 101, it is detected whether the flight device meets a condition for landing.

In step 102, it is detected whether a current landing area for the flight device is a safe landing area, when the flight device meets the condition for landing. The safe landing area is an area on the ground which enables the flight device to land safely.

In step 103, the current landing area for the flight device is adjusted to the safe landing area, when the current landing area is not the safe landing area.

The method for controlling a flight device provided by the present disclosure enables the flight device to land in a safe landing area without need of control from a terminal, by detecting whether a current landing area for the flight device is a safe landing area, when the flight device meets a condition for landing, and adjusting the current landing area for the flight device to the safe landing area, when the current landing area is not the safe landing area. Therefore, when the flight device is landing according to a landing area determined by a terminal, the flight device will not land in an unsafe landing area, when the determined landing area is inaccurate, and it is thus convenient for an operator to recover the flight device, thereby achieving an effect of improving recover efficiency of the flight device.

Figure 2:
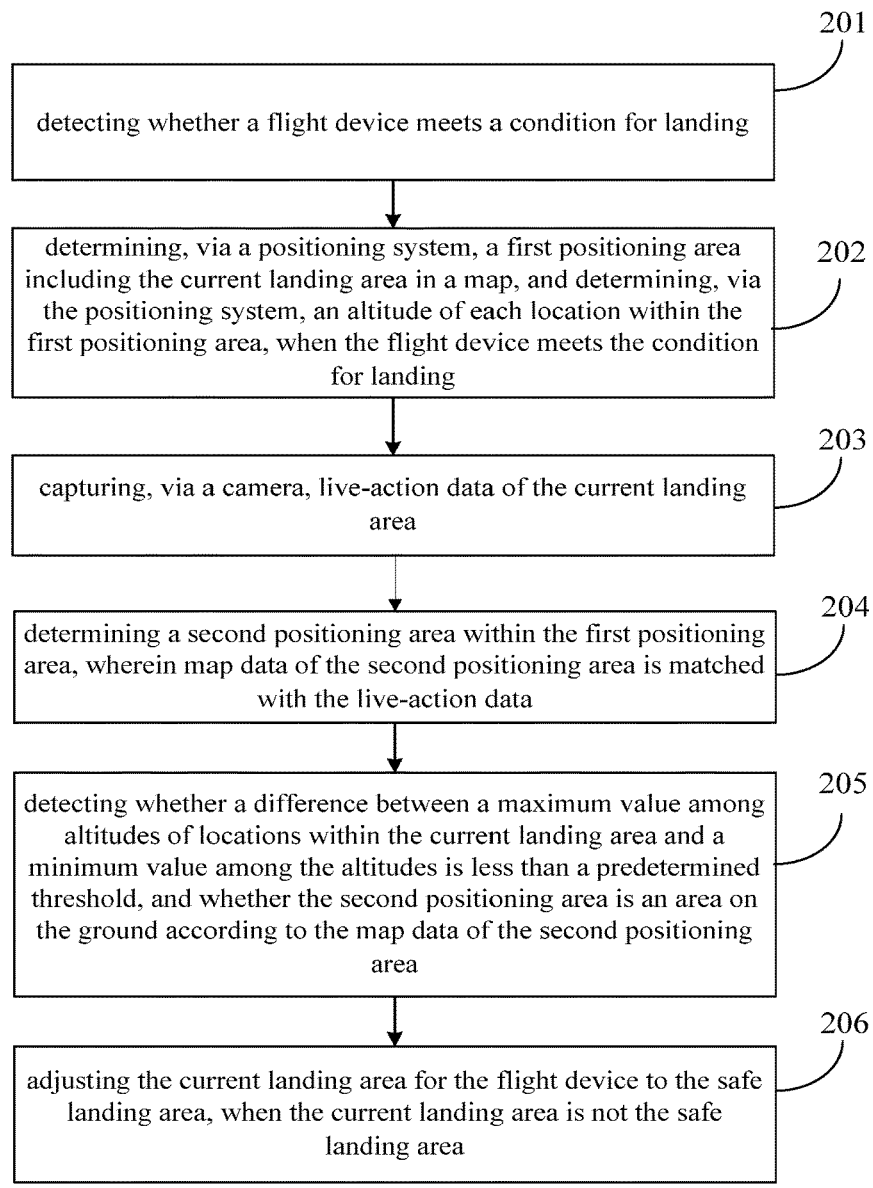
FIG. 2 is a flow diagram illustrating a method for controlling a flight device according to another exemplary embodiment.

FIG. 2 is a flow diagram illustrating a method for controlling a flight device according to another exemplary embodiment. The method for controlling a flight device may be applied to a flight device configured with a positioning system and a camera. As shown in FIG. 2, the method for controlling a flight device may include following steps.

In step 201, it is detected whether the flight device meets a condition for landing.

The condition for landing may be reception of a landing instruction transmitted by a terminal which controls the flight device, or may be that a power of the flight device is lower than a predetermined threshold, which is not limited in the present embodiment. The landing instruction may instruct the flight device to land.

When the flight device detects that it meets the condition for landing, it may perform step 202; otherwise, it will keep flying.

In step 202, when the flight device meets the condition for landing, a first positioning area including the current landing area may be determined in a map, via the positioning system; and an altitude of each location within the first positioning area may also be determined via the positioning system.

Figure 3:
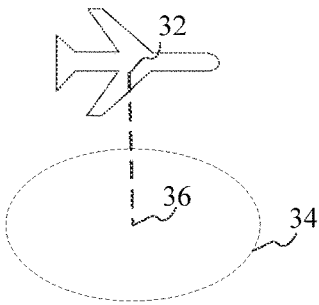
FIG. 3 is a schematic diagram of a landing area.

The landing area is constructed by respective areas where the flight device may land. The respective areas where the flight device may land refer to a location where the flight device is projected vertically on the ground when it meets the condition for landing and respective locations whose distances from said location are less than a predetermined distance. For example, as shown in FIG. 3, the flight device is at a location 32 when it meets the condition for landing. The landing area may be constructed by a location 36 where the flight device is projected vertically on the ground and respective locations which are away from the location less than 10 m.

The safe landing area is an area on the ground which enables the flight device to land safely. Moreover, in this embodiment, a difference between a maximum value among altitudes of locations within the area on the ground and a minimum value among the altitudes is less than a predetermined threshold. That is because the safe landing area should enable a user to recover the flight device easily. When the safe landing area is not an area on the ground, it may be an area, such as a river or lake etc., where it is difficult for the user to recover the flight device; or when the difference between the maximum value among altitudes of locations within the area on the ground and the minimum value among the altitudes is greater than the predetermined threshold, the area may be a rooftop, a mountain or a tree etc. where it is also difficult for the user to recover the flight device.

A map is pre-stored in the flight device. The map may be downloaded by the flight device in advance from the Internet, or it may be downloaded from the Internet and then sent to the flight device by the terminal which controls the flight device, which is not limited in the present embodiment. The map may include location data and map data. The location data is information about a longitude and latitude of each location, for example, location data of China is 73 degrees east longitude to 135 degrees east longitude and 4 degrees north latitude to 53 degrees north latitude. The map data is image data of each site in the map. Moreover, the map data is 3-dimensional (3D) image data of each site, such as, 3D image data of a residential community.

The positioning system has a positioning function and a function for altitude measurement. Since the positioning system can only position the landing area roughly, the first area as determined may be broader than the landing area. The flight device may use the positioning function of the positioning system to obtain longitude and latitude information of an area including the landing area and determine an area (which may be referred to as a first positioning area in the embodiment) corresponding to the longitude and latitude information from the location data of the map. For example, the flight device uses the positioning function of the positioning system to obtain longitude and latitude information (such as, xx°xx'x.xx" north latitude and xx°xx'x.xx" east longitude) including the landing area and determines an area (such as, residential community yy) corresponding to the longitude and latitude information from the location data of the map. The residential community yy is then determined as the first positioning area.

The flight device may use the function for altitude measurement of the positioning system to obtain an altitude of each location within the first position area.

In step 203, live-action data of the current landing area is captured with the camera.

The camera may capture the live-action data of the landing area in real time. The live-action data refers to actual image data of the landing area, for example, image data of the landing area 34 in FIG. 3.

Step 203 may be performed after or before step 202, or it may also be performed concurrently with step 202, which is not limited in the present embodiment.

In step 204, a second positioning area is determined within the first positioning area. Map data of the second positioning area is matched with the live-action data.

The flight device may look up the second positioning area matching the live-action data in map data of the first positioning area. The obtained location data of the second positioning area is substantially the same as live-action data of the actual landing area. For example, after determining that the first positioning area is the residential community yy utilizing the positioning function of the positioning system, the flight device may match the live-action data of the actual landing area with image data of the residential community yy, so as to derive that the second positioning area is a residential building zz in the residential community yy.

Since the positioning system can only position the first positioning area in the map which corresponds to the landing area roughly, the present embodiment improves the accuracy of determining an area corresponding to the landing area in the map, by matching the live-action data with the map data of the first positioning area and obtaining the second positioning area of which the map data is matched with the live-action data.

In step 205, it is detected whether a difference between a maximum value among altitudes of locations within the current landing area and a minimum value among the altitudes is less than a predetermined threshold, and it is detected whether the second positioning area is an area on the ground according to the map data of the second positioning area.

When the difference between the maximum value among the altitudes of locations within the current landing area and the minimum value among the altitudes is greater than the predetermined threshold or when it is determined that the second positioning area is not the area on the ground according to the map data of the second positioning area, the landing area may not be the safe landing area, and the landing area for the flight device may need to be adjusted, as shown in step 206. When the difference between the maximum value among the altitudes of locations within the current landing area and the minimum value among the altitudes is less than the predetermined threshold and it is determined that the second positioning area is the area on the ground according to the map data of the second positioning area, the landing area is the safe landing area where the flight device may land directly.

When detecting whether the difference between the maximum value among altitudes of locations within the landing area and the minimum value among the altitudes is less than the predetermined threshold, the flight device may screen out the altitude of each location within the second positioning area from the altitude of each location within the first positioning area obtained in advance, subtract a minimum value among the screened out altitudes of locations within the second positioning area from a maximum value among the altitudes of locations within the second positioning area, detect whether the result of the subtraction is less than the predetermined threshold, and take the result of the detection as the result of detecting whether the difference between the maximum value among altitudes of locations within the current landing area and the minimum value among the altitudes is less than the predetermined threshold. In another embodiment, the flight device may subtract a minimum value among the altitudes of locations within the first positioning area from a maximum value among the altitudes of locations within the first positioning area, detect whether the result of the subtraction is less than the predetermined threshold, and take the result of the detection as the result of detecting whether the difference between the maximum value among altitudes of locations within the current landing area and the minimum value among the altitudes is less than the predetermined threshold. It is not limited in the embodiment.

In an implementation, when detecting whether the landing area is an area on the ground, the flight device may perform image recognition on the live-action data captured by the camera to detect whether the live-action data includes objects, such as, water or a tree etc. However, the live-action data captured by the camera is a vertical view of the landing area. If the flight device only use the vertical view to detect whether the landing area is an area on the ground, the result of the detection may be inaccurate.

In another implementation, when detecting whether the landing area is an area on the ground, the flight device may perform image recognition on the map data of the second positioning area to detect whether the second positioning area is an area on the ground. Since the map data is 3D image information which may fully reflect objects included in the second positioning area, the flight device may increase the accuracy of detecting whether the landing area is an area on the ground by detecting the map data of the second positioning area.

In step 206, the current landing area for the flight device is adjusted to the safe landing area, when the current landing area is not the safe landing area.

When the landing area is not the safe landing area, it may mean that the topography of the landing area is not flat and the landing area may be an area such as, a mountain, a rooftop and a tree etc.; or it may mean that the landing area is not an area on the ground and the landing area may be an area such as, water and a lake etc. In such situation, the flight device may land on the rooftop, mountain, tree or water. Therefore, the flight device needs to adjust its landing area.

In an implementation, adjusting the current landing area for the flight device to the safe landing area may include: adjusting the current landing area and detecting whether the adjusted landing area for the flight device is the safe landing area according to steps 203 to 205; and continuing execution of adjusting the adjusted landing area, when the adjusted landing area is not the safe landing area, until the adjusted landing area is the safe landing area.

In the implementation, the flight device detects whether the landing area below is the safe landing area in real time and lands until the safe landing area is detected. In this situation, the flight device adjusts the landing area in a disorderly fashion. It is possible that every landing area as adjusted is not the safe landing area. Therefore, this implementation wastes resources which the flight device uses to detect whether the landing area is the safe landing area.

In another implementation, adjusting the current landing area for the flight device to the safe landing area may include: determining one or more safe landing areas from a database of safe landing area, or analyzing map data in the map and determining one or more safe landing areas according to a result of the analysis; obtaining, via a positioning system, a current location of the flight device; determining a safe landing area closest to the current location from the one or more safe landing areas; and adjusting the landing area for the flight device to the determined safe landing area.

In the implementation, under a precondition of awareness of location information about one or more safe landing areas, the flight device may find the safe landing area closest to the current location, and adjust its landing area to the safe landing area. Therefore, this implementation saves resources which the flight device uses to detect whether the landing area is the safe landing area.

The method for controlling a flight device provided in the above embodiment of the present disclosure enables the flight device to land in a safe landing area without need of control from a terminal, by detecting whether a current landing area for the flight device is a safe landing area, when the flight device meets a condition for landing, and adjusting the current landing area for the flight device to the safe landing area, when the landing area is not the safe landing area. Therefore, when the flight device is landing according to a landing area determined by a terminal, the flight device will not land in an unsafe landing area even if the determined landing area is inaccurate, and it is thus convenient for an operator to recover the flight device, thereby achieving an effect of improving recover efficiency of the flight device.

Further, the method for controlling a flight device enables the flight device to determine the second positioning area matched with the live-action data captured by the camera without taking all map data into consideration, by determining, via the positioning system, the first positioning area including the current landing area in the map, capturing, via the camera, live-action data and determining the second positioning area matched with the live-action data within the first positioning area. Therefore, the method reduces resources which the flight device consumes to determine the second positioning area matched with the live-action data.

Further, the method for controlling a flight device may increase accuracy for determining whether the current landing area for the flight device is the safe landing area, by determining the second positioning area, wherein map data of the second positioning area is matched with live-action data captured by the camera within the first positioning area, so as to enable the second positioning area determined by the flight device to be closer to an actual landing area.

Figure 4:
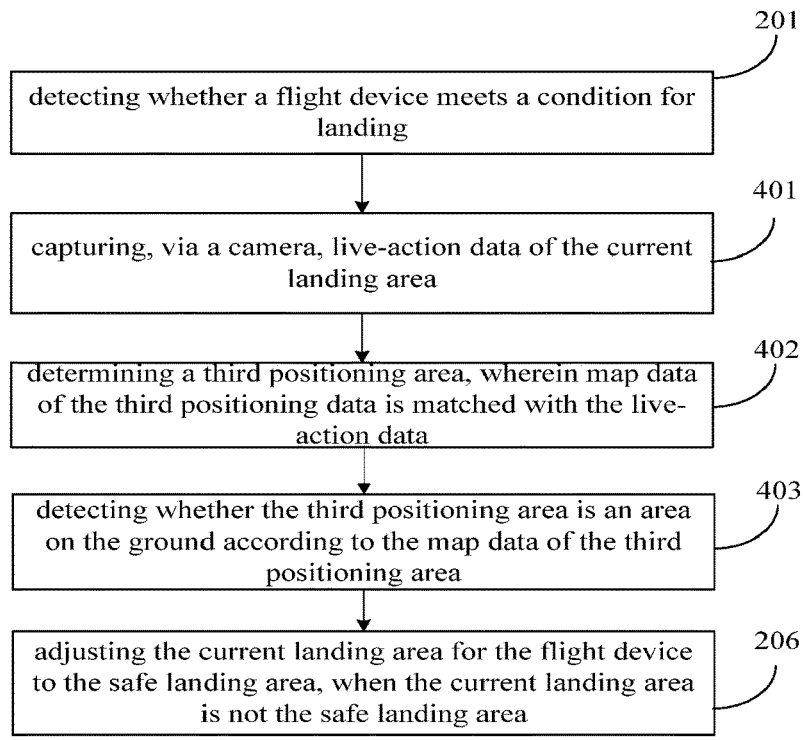
FIG. 4 is a flow diagram illustrating a method for controlling a flight device according to another exemplary embodiment.

Referring to FIG. 4, FIG. 4 shows a flow diagram illustrating a method for controlling a flight device according to another embodiment. The method for controlling a flight device may be applied to a flight device configured only with a camera. As shown in FIG. 4, steps 202-205 of FIG. 2 after step 201 may be substituted with following steps.

In step 401, live-action data of the current landing area is captured by the camera. This step is the same as step 203, which will not be repeated herein.

In step 402, a third positioning area is determined. Map data of the third positioning area is matched with the live-action data.

The flight device may search the third positioning area matched with the live-action data from pre-stored map data.

In step 403, it is detected whether the third positioning area is an area on the ground according to the map data of the third positioning area.

In an implementation, the flight device may perform image recognition on the captured live-action data to detect whether the live-action data includes objects, such as, water, a tree or a rooftop etc. However, the live-action data captured by the camera is a vertical view of the landing area. If the flight device only use the vertical view to detect whether the landing area is an area on the ground, the result of the detection may be inaccurate.

In another implementation, the flight device may perform image recognition on the map data of the third positioning area to detect whether the third positioning area is an area on the ground and whether the third positioning area includes objects, such as, water, a tree or a rooftop etc. Since the map data is 3D image information which may fully reflect objects included in the third positioning area, the flight device may increase the accuracy of detecting whether the landing area is an area on the ground by detecting the map data of the third positioning area.

When the flight device detects that the third positioning area is not an area on the ground, it determines that the landing area is not the safe landing area and needs to be adjusted as shown in step 206. When the third positioning area is an area on the ground, the flight device determines that the landing area is the safe landing area, and it may land directly.

It should be noted that since the flight device is only configured with the camera, in the embodiment, adjusting the current landing area for the flight device to the safe landing area in step 206 may include: adjusting the current landing area and detecting whether the adjusted landing area for the flight device is the safe landing area according to steps 401-403; and continuing execution of adjusting the adjusted landing area, when the adjusted landing area is not the safe landing area, until the adjusted landing area is the safe landing area.

The method for controlling a flight device provided by the present disclosure simplifies the structure of the flight device, by identifying whether the current landing area for the flight device is the safe landing area via the camera, so as to enable the flight device to identify whether the landing area is the safe landing area without a configuration of a positioning system.

Figure 5:
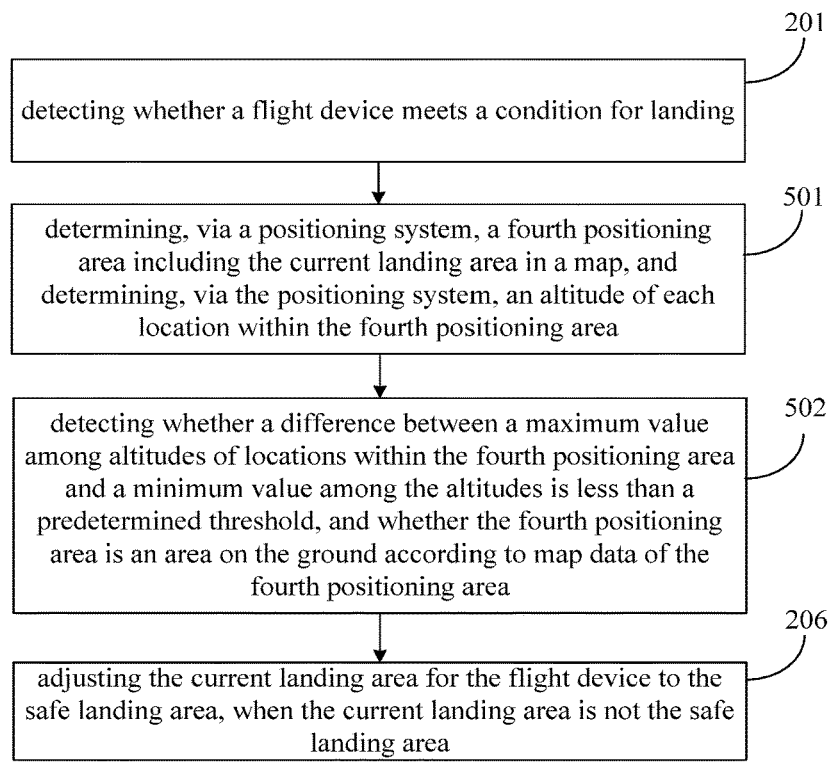
FIG. 5 is a flow diagram illustrating a method for controlling a flight device according to another exemplary embodiment.

Referring to FIG. 5, FIG. 5 shows a flow diagram illustrating a method for controlling a flight device according to another embodiment. The method for controlling a flight device may be applied to a flight device configured only with a positioning system. As shown in FIG. 5, steps 202-205 of FIG. 2 after step 201 may be substituted with following steps.

In step 501, a fourth positioning area including the current landing area is determined by the positioning system in a map, and an altitude of each location within the fourth positioning area is determined by the positioning system. This step is the same as step 202, which will not be repeated herein.

In step 502, it is detected whether a difference between a maximum value among altitudes of locations within the fourth positioning area and a minimum value among the altitudes is less than a predetermined threshold, and it is detected whether the fourth positioning area is an area on the ground according to map data of the fourth positioning area.

When the difference between the maximum value among the altitudes of locations within the fourth positioning area and the minimum value among the altitudes is greater than the predetermined threshold or the fourth positioning area is not an area on the ground, it means that the landing area is not the safe landing area and step 206 will be performed. When the difference between the maximum value among the altitudes of locations within the fourth positioning area and the minimum value among the altitudes is less than the predetermined threshold and the fourth positioning area is an area on the ground, the flight device determines that the landing area is the safe landing area, and it may land directly.

It should be noted that since the flight device is only configured with the positioning system, in the embodiment, adjusting the current landing area for the flight device to the safe landing area in an implementation of step 206 may include: adjusting the current landing area and detecting whether the adjusted landing area for the flight device is the safe landing area according to steps 501-502; and continuing execution of adjusting the adjusted landing area, when the adjusted landing area is not the safe landing area, until the adjusted landing area is the safe landing area.

In another implementation of step 206, adjusting the current landing area for the flight device to the safe landing area may include: determining one or more safe landing areas from a database of safe landing area, or analyzing map data in a map and determining one or more safe landing areas according to a result of the analysis; obtaining, via a positioning system, a current location of the flight device; determining a safe landing area closest to the current location from the one or more safe landing areas; and adjusting the landing area for the flight device to the determined safe landing area.

The method for controlling a flight device provided in the above embodiment of the present disclosure simplifies the structure of the flight device, by identifying whether the current landing area for the flight device is the safe landing area utilizing the positioning system, so as to enable the flight device to identify whether the landing area is the safe landing area without a configuration of a camera.

Figure 6:
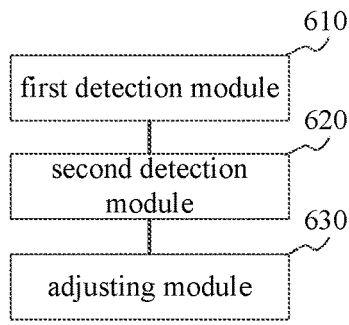
FIG. 6 is a block diagram illustrating an apparatus for controlling a flight device according to an exemplary embodiment.

FIG. 6 is a block diagram illustrating an apparatus for controlling a flight device according to an exemplary embodiment. The apparatus for controlling a flight device may be applied to a flight device. As shown in FIG. 6, the apparatus for controlling a flight device may include: a first detection module 610, a second detection module 620 and an adjusting module 630.

The first detection module 610 is configured to detect whether the flight device meets a condition for landing.

The second detection module 620 is configured to detect whether a current landing area for the flight device is a safe landing area, when it is detected by the first detection module 610 that the flight device meets the condition for landing. The safe landing area is an area on the ground which enables the flight device to land safely The adjusting module 630 is configured to adjust the current landing area for the flight device to the safe landing area, when it is detected by the second detection module 620 that the current landing area is not the safe landing area.

The apparatus for controlling a flight device provided in the above embodiment of the present disclosure enables the flight device to land in a safe landing area without need of control from a terminal, by detecting whether a current landing area for the flight device is a safe landing area, when the flight device meets a condition for landing, and adjusting the current landing area for the flight device to the safe landing area, when the current landing area is not the safe landing area. Therefore, when the flight device is landing according to a landing area determined by a terminal, the flight device will not land in an unsafe landing area even if the determined landing area is inaccurate, and it is thus convenient for an operator to recover the flight device, thereby achieving an effect of improving recover efficiency of the flight device.

Figure 7:
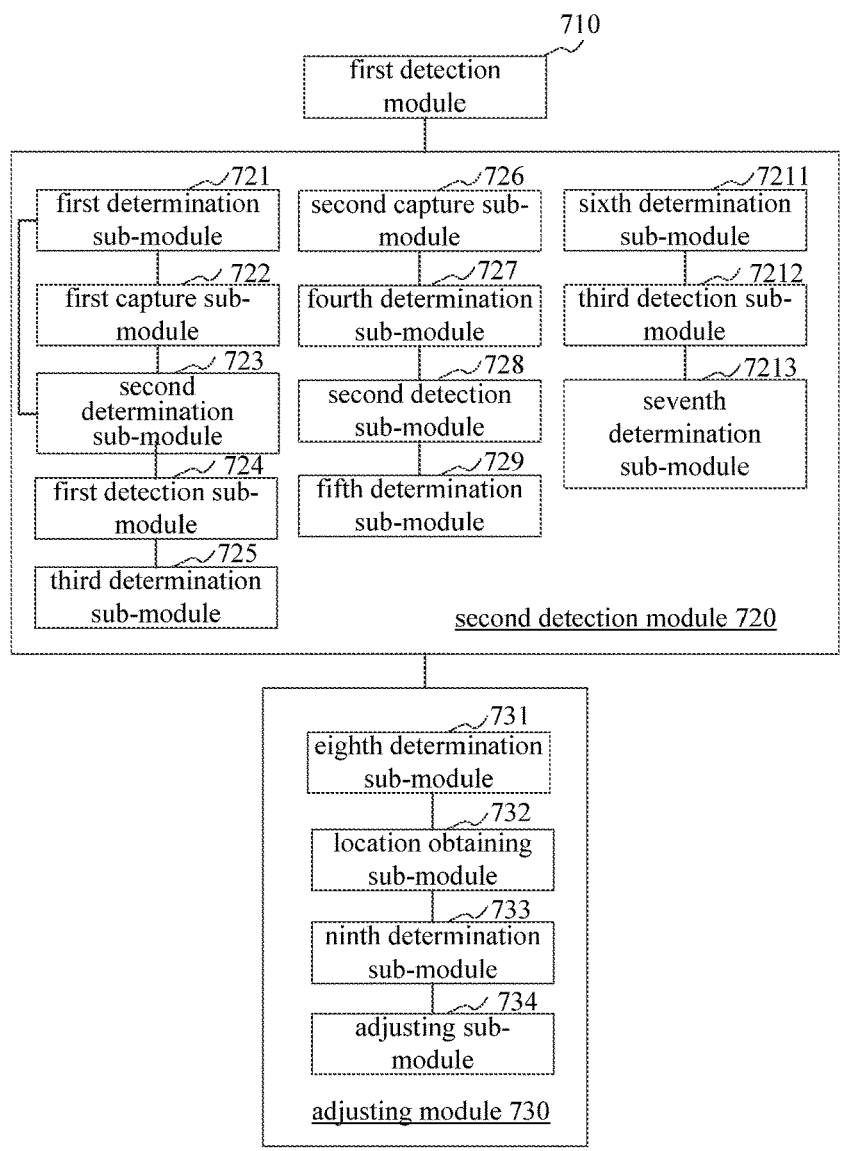
FIG. 7 is a block diagram illustrating an apparatus for controlling a flight device according to another exemplary embodiment.

FIG. 7 is a block diagram illustrating an apparatus for controlling a flight device according to an exemplary embodiment. The apparatus for controlling a flight device may be applied to a flight device. As shown in FIG. 7, the apparatus for controlling a flight device may include: a first detection module 710, a second detection module 720 and an adjusting module 730.

The first detection module 710 is configured to detect whether the flight device meets a condition for landing.

The second detection module 720 is configured to detect whether a current landing area for the flight device is a safe landing area, when it is detected by the first detection module 710 that the flight device meets the condition for landing. The safe landing area is an area on the ground which enables the flight device to land safely The adjusting module 730 is configured to adjust the current landing area for the flight device to the safe landing area, when it is detected by the second detection module 720 that the current landing area is not the safe landing area.

In an embodiment, the second detection module 720 may include a first determination sub-module 721, a first capture sub-module 722, a second determination sub-module 723, a first detection sub-module 724 and a third determination sub-module 725.

The first determination sub-module 721 is configured to determine, via a positioning system, a first positioning area including the current landing area in a map, and determine, via the positioning system, an altitude of each location within the first positioning area.

The first capture sub-module 722 is configured to capture, via a camera, live-action data of the current landing area.

The second determination sub-module 723 is configured to determine a second positioning area within the first positioning area. Map data of the second positioning area is matched with the live-action data captured by the first capture sub-module 722.

The first detection sub-module 724 is configured to detect whether a difference between a maximum value among altitudes of locations within the current landing area and a minimum value among the altitudes is less than a predetermined threshold, and detect whether the second positioning area is an area on the ground according to the map data of the second positioning area.

The third determination sub-module 725 is configured to determine that the current landing area is the safe landing area, when the first detection sub-module 724 detects that the difference between the maximum value among the altitudes of locations within the current landing area and a minimum value among the altitudes is less than the predetermined threshold and the second positioning area is the area on the ground.

In another embodiment, the second detection module 720 may include a second capture sub-module 726, a fourth determination sub-module 727, a second detection sub-module 728 and a fifth determination sub-module 729.

The second capture sub-module 726 is configured to capture, via a camera, live-action data of the current landing area.

The fourth determination sub-module 727 is configured to determine a third positioning area. Map data of the third positioning area is matched with the live-action data captured by the second capture sub-module 726.

The second detection sub-module 728 is configured to detect whether the third positioning area is an area on the ground according to the map data of the third positioning area determined by the fourth determination sub-module 727.

The fifth determination sub-module 729 is configured to determine that the current landing area is the safe landing area, when it is determined by the second detection sub-module 728 that the third positioning area is the area on the ground.

In another embodiment, the second detection module 720 may include a sixth determination sub-module 7211, a third detection sub-module 7212 and a seventh determination sub-module 7213.

The sixth determination sub-module 7211 is configured to determine, via a positioning system, a fourth positioning area including the current landing area in a map, and determine, via the positioning system, an altitude of each location within the fourth positioning area.

The third detection sub-module 7212 is configured to detect whether a difference between a maximum value among altitudes of locations within the fourth positioning area determined by the sixth determination sub-module 7211 and a minimum value among the altitudes is less than a predetermined threshold, and detect whether the fourth positioning area is an area on the ground according to map data of the fourth positioning area.

The seventh determination sub-module 7213 is configured to determine that the current landing area is the safe landing area, when the third detection sub-module 7212 detects that the difference between the maximum value among the altitudes of locations within the fourth positioning area and the minimum value among the altitudes is less than the predetermined threshold and that the fourth positioning area is the area on the ground.

In an embodiment, the adjusting module 730 is further configured to: adjust the current landing area and trigger the second detection module 720 to detect whether the current landing area for the flight device is the safe landing area; and continue execution of adjusting the landing area, when the second detection module 720 detects that the current landing area is not the safe landing area, until the current landing area is the safe landing area.

Alternatively, the adjusting module 730 may include an eighth determination sub-module 731, a location obtaining sub-module 732, a ninth determination sub-module 733 and an adjusting sub-module 734.

The eighth determination sub-module 731 is configured to determine one or more safe landing areas from a database of safe landing area, or analyze map data in a map and determine one or more safe landing areas according to a result of the analysis.

The location obtaining sub-module 732 is configured to obtain, via a positioning system, a current location of the flight device.

The ninth determination sub-module 733 is configured to determine a safe landing area closest to the current location obtained by the location obtaining sub-module 732, from the one or more safe landing areas determined by the eighth determination sub-module 731.

The adjusting sub-module 734 is configured to adjust the current landing area for the flight device to the safe landing area determined by the ninth determination sub-module 733.

The apparatus for controlling a flight device provided in the above embodiments of the present disclosure enables the flight device to land in a safe landing area without need of control from a terminal, by detecting whether a current landing area for the flight device is a safe landing area, when the flight device meets a condition for landing, and adjusting the current landing area for the flight device to the safe landing area, when the current landing area is not the safe landing area. Therefore, when the flight device is landing according to a landing area determined by a terminal, the flight device will not land in an unsafe landing area even if the determined landing area is inaccurate, and it is thus convenient for an operator to recover the flight device, thereby achieving an effect of improving recover efficiency of the flight device.

Further, the apparatus for controlling a flight device enables the flight device to determine the second positioning area matched with the live-action data captured by the camera without taking all map data into consideration, by determining, via the positioning system, the first positioning area including the current landing area in the map, capturing, via the camera, live-action data and determining the second positioning area matched with the live-action data within the first positioning area. Therefore, the apparatus reduces resources which the flight device consumes to determine the second positioning area matched with the live-action data.

Further, the apparatus for controlling a flight device may increase accuracy for determining whether the current landing area for the flight device is the safe landing area, by determining the second positioning area, wherein map data of the second positioning area is matched with live-action data captured by the camera within the first positioning area, so as to enable the second positioning area determined by the flight device to be closer to an actual landing area.

Further, the apparatus for controlling a flight device provided by the present disclosure simplifies the structure of the flight device, by identifying whether the current landing area for the flight device is the safe landing area utilizing the camera, so as to enable the flight device to identify whether the landing area is the safe landing area without a configuration of a positioning system.

Further, the apparatus for controlling a flight device provided by the present disclosure simplifies the structure of the flight device, by identifying whether the current landing area for the flight device is the safe landing area utilizing the positioning system, so as to enable the flight device to identify whether the landing area is the safe landing area without a configuration of a camera.

Regarding the apparatuses in the above embodiments, specific ways by which respective modules perform operations have been described in details in corresponding method embodiments, which will not be detailed herein.

An apparatus for controlling a flight device is provided by an exemplary embodiment of the disclosure, which can implement the method for controlling a flight device provided in the disclosure. The apparatus for controlling a flight device may include a processor and a memory for storing instructions executable by the processor. The processor is configured to detect whether the flight device meets a condition for landing; detect whether a current landing area for the flight device is a safe landing area, when the flight device meets the condition for landing, wherein the safe landing area is an area on the ground which enables the flight device to land safely; and adjust the current landing area for the flight device to the safe landing area, when the current landing area is not the safe landing area.

Figure 8:
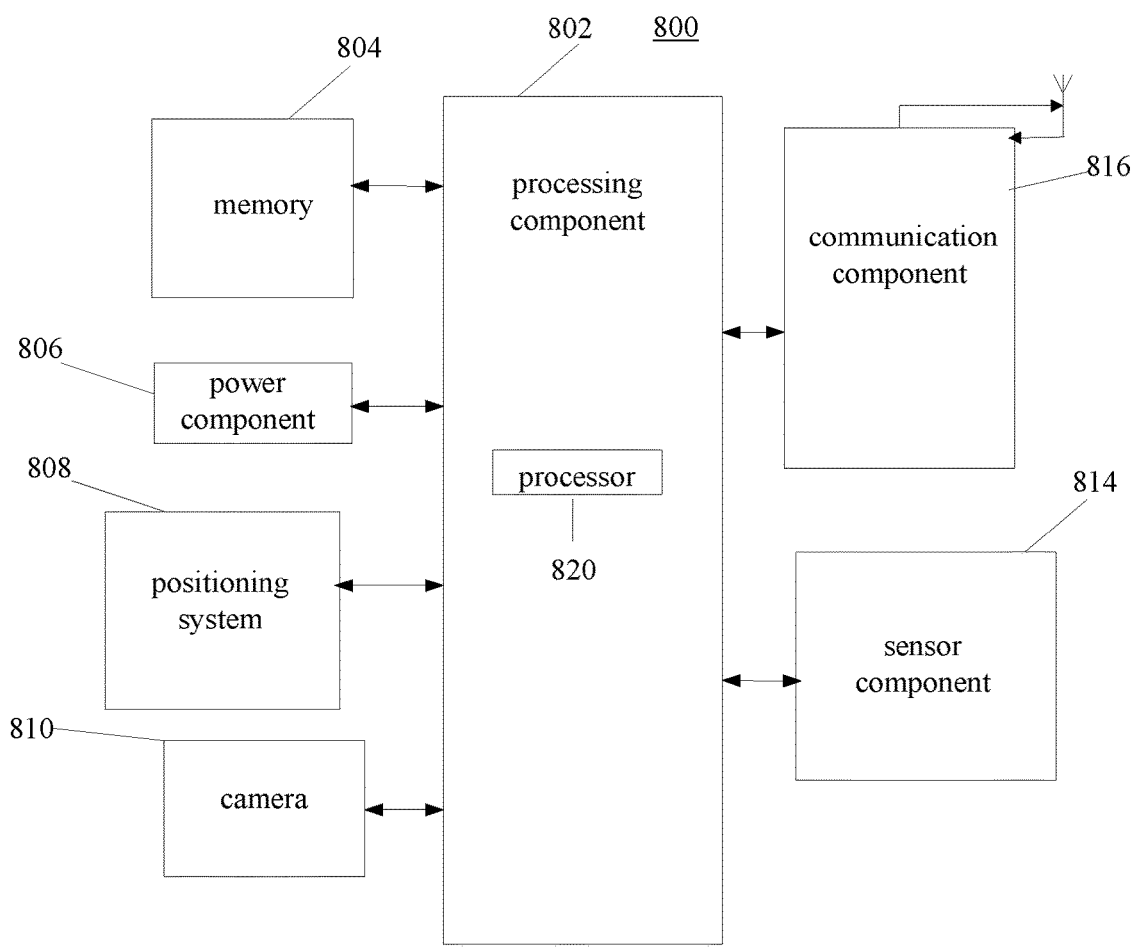
FIG. 8 is a block diagram illustrating an apparatus for controlling a flight device according to another exemplary embodiment.

FIG. 8 is a block diagram illustrating an apparatus 800 for controlling a flight device according to an exemplary embodiment. Referring to FIG. 8, the apparatus 800 may include one or more of the following components: a processing component 802, a memory 804, a power component 806, a positioning system 808, a camera 810, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between a multimedia component and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power for the apparatus 800.

The positioning system 808 determines a location for the apparatus 800 and detects an altitude of a landing area for the apparatus 800.

The camera 810 may be used to capture live-action data of the landing area of the apparatus 800.

The sensor component 814 includes one or more sensors to provide status assessments of various aspects of the apparatus 800. For instance, the sensor component 814 may detect an open/closed status of the apparatus 800, relative positioning of components (e.g., the display and the keypad, of the apparatus 800), a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of a nearby object without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 800 and other apparatuses. The apparatus 800 can access a wireless network based on a communication standard, such as WiFi, 2G or 3G or a combination thereof. In an exemplary embodiment, the communication component 816 receives a broadcast signal or broadcast associated information from an external broadcast management system via a broadcast channel. In an exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the apparatus 800, for performing the above-described methods. For example, the non-transitory computer-readable storage medium may be a ROM, a RAM, a CD-ROM, a magnetic tape, a floppy disc, an optical data storage device, and the like.

The disclosure further provides a non-transitory computer readable storage medium having stored therein instructions that, when executed by the apparatus 800, cause the apparatus 800 to perform the method for landing a flight device provided in various embodiments of the disclosure. The method may include: detecting whether the flight device meets a condition for landing; detecting whether a current landing area for the flight device is a safe landing area, when the flight device meets the condition for landing, wherein the safe landing area is an area on the ground which enables the flight device to land safely; and adjusting the current landing area for the flight device to the safe landing area, when the current landing area is not the safe landing area.

Other embodiments will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for landing a flight device, the method comprising:
   detecting whether the flight device meets a condition for landing;
   detecting whether a current landing area for the flight device is a safe landing area, when the flight device meets the condition for landing, wherein the current landing area is an area comprising a location where the flight device is projected vertically on the ground when it meets the condition for landing and respective locations whose distances from said location are less than a predetermined distance, and the safe landing area is an area on the ground which enables the flight device to land safely; and
   adjusting the current landing area for the flight device to the safe landing area, when the current landing area is not the safe landing area.

2. The method of claim 1, wherein detecting whether the current landing area for the flight device is the safe landing area comprises:
   determining, via a positioning system, a first positioning area comprising the current landing area in a map;
   determining, via the positioning system, an altitude of each location within the first positioning area;
   capturing, via a camera, live-action data of the current landing area;
   determining a second positioning area within the first positioning area, wherein map data of the second positioning area is matched with the live-action data;
   detecting whether a difference between a maximum value among altitudes of locations within the current landing area and a minimum value among the altitudes is less than a predetermined threshold, and whether the second positioning area is an area on the ground according to the map data of the second positioning area; and
   determining that the current landing area is the safe landing area, when the difference between the maximum value among the altitudes of locations within the current landing area and a minimum value among the altitudes is less than the predetermined threshold and the second positioning area is the area on the ground.

3. The method of claim 1, wherein detecting whether the current landing area for the flight device is the safe landing area comprises:
   capturing, via a camera, live-action data of the current landing area;
   determining a third positioning area, wherein map data of the third position area is matched with the live-action data;
   detecting whether the third positioning area is an area on the ground according to the map data of the third positioning area; and determining that the current landing area is the safe landing area, when the third positioning area is the area on the ground.

4. The method of claim 1, wherein detecting whether the current landing area for the flight device is the safe landing area comprises:
 determining, via a positioning system, a fourth positioning area comprising the current landing area in a map;
 determining, via the positioning system, an altitude of each location within the fourth positioning area;
 detecting whether a difference between a maximum value among altitudes of locations within the fourth positioning area and a minimum value among the altitudes is less than a predetermined threshold and whether the fourth positioning area is an area on the ground according to map data of the fourth positioning area; and
 determining that the current landing area is the safe landing area, when the difference between the maximum value among the altitudes of locations within the fourth positioning area and the minimum value among the altitudes is less than the predetermined threshold and the fourth positioning area is the area on the ground.

5. The method of claim 1, wherein adjusting the current landing area for the flight device to the safe landing area comprises:
 adjusting the current landing area;
 triggering execution of detecting whether the current landing area for the flight device is the safe landing area; and
 continuing execution of adjusting the landing area until the current landing area is the safe landing area, when the current landing area is not the safe landing area.

6. The method of claim 1, wherein adjusting the current landing area for the flight device to the safe landing area comprises:
 determining one or more safe landing areas from a database of safe landing area; obtaining, via a positioning system, a current location of the flight device;
 determining a safe landing area closest to the current location from the one or more safe landing areas; and
 adjusting the current landing area for the flight device to the determined safe landing area.

7. The method of claim 1, wherein adjusting the landing area for the flight device to the safe landing area comprises:
 analyzing map data in a map and determining one or more safe landing areas according to a result of the analysis;
 obtaining, via a positioning system, a current location of the flight device;
 determining a safe landing area closest to the current location from the one or more safe landing areas; and
 adjusting the current landing area for the flight device to the determined safe landing area.

8. An apparatus for landing a flight device, the apparatus comprising:
 a processor; and
 a memory for storing instructions executable by the processor;
 wherein the processor is configured to:
 detect whether the flight device meets a condition for landing;
 detect whether a current landing area for the flight device is a safe landing area, when it is detected that the flight device meets the condition for landing, wherein the current landing area is an area comprising a location where the flight device is projected vertically on the ground when it meets the condition for landing and respective locations whose distances from said location are less than a predetermined distance, and the safe landing area is an area on the ground which enables the flight device to land safely; and
 adjust the current landing area for the flight device to the safe landing area, when it is detected that the current landing area is not the safe landing area.

9. The apparatus of claim 8, wherein the processor configured to detect whether the current landing area for the flight device is the safe landing area is further configured to:
 determine, via a positioning system, a first positioning area comprising the current landing area in a map;
 determine, via the positioning system, an altitude of each location within the first positioning area;
 capture, via a camera, live-action data of the current landing area;
 determine a second positioning area within the first positioning area, wherein map data of the second positioning area is matched with the live-action data;
 detect whether a difference between a maximum value among altitudes of locations within the current landing area and a minimum value among the altitudes is less than a predetermined threshold, and whether the second positioning area is an area on the ground according to the map data of the second positioning area; and
 determine that the current landing area is the safe landing area, when it is detected that the difference between the maximum value among the altitudes of locations within the current landing area and a minimum value among the altitudes is less than the predetermined threshold and the second positioning area is the area on the ground.

10. The apparatus of claim 8, wherein processor configured to detect whether the current landing area for the flight device is the safe landing area is further configured to:
 capture, via a camera, live-action data of the current landing area;
 determine a third positioning area, wherein map data of the third position area is matched with the live-action data;
 detect whether the third positioning area is an area on the ground according to the map data of the third positioning area; and
 determine that the current landing area is the safe landing area, when it is detected that the third positioning area is the area on the ground.

11. The apparatus of claim 8, wherein the processor configured to detect whether the current landing area for the flight device is the safe landing area is further configured to:
 determine, via a positioning system, a fourth positioning area comprising the current landing area in a map;
 determine, via the positioning system, an altitude of each location within the fourth positioning area;
 detect whether a difference between a maximum value among altitudes of locations within the fourth positioning area and a minimum value among the altitudes is less than a predetermined threshold, and whether the fourth positioning area is an area on the ground according to map data of the fourth positioning area; and
 determine that the current landing area is the safe landing area, when it is detected that the difference between the maximum value among the altitudes of locations within the fourth positioning area and the minimum value among the altitudes is less than the predetermined threshold and the fourth positioning area is the area on the ground.

12. The apparatus of claim 8, wherein the processor configured to adjust the current landing area for the flight device to the safe landing area is further configured to:

adjust the current landing area;

trigger execution of detecting whether the current landing area for the flight device is the safe landing area; and continue execution of adjusting the landing area until the current landing area is the safe landing area when it is detected that the current landing area is not the safe landing area.

13. The apparatus of any one of claim 8, wherein the processor configured to adjust the current landing area for the flight device to the safe landing area is further configured to:

determine one or more safe landing areas from a database of safe landing area;

obtain, via a positioning system, a current location of the flight device;

determine a safe landing area closest to the current location from the one or more safe landing areas; and adjust the current landing area for the flight device to the determined safe landing area.

14. The apparatus of any one of claim 8, wherein the processor configured to adjust the current landing area for the flight device to the safe landing area is further configured to:

analyze map data in a map and determining one or more safe landing areas according to a result of the analysis;

obtain, via a positioning system, a current location of the flight device;

determine a safe landing area closest to the current location from the one or more safe landing areas; and adjust the current landing area for the flight device to the determined safe landing area.

15. A non-transitory computer-readable storage medium having stored therein instructions that, when executed by a processor, cause the processor to perform a method for controlling a flight device, the method comprising:

detecting whether the flight device meets a condition for landing;

detecting whether a current landing area for the flight device is a safe landing area, when the flight device meets the condition for landing, wherein the current landing area is an area comprising a location where the flight device is projected vertically on the ground when it meets the condition for landing and respective locations whose distances from said location are less than a predetermined distance, and the safe landing area is an area on the ground which enables the flight device to land safely; and adjusting the current landing area for the flight device to the safe landing area, when the current landing area is not the safe landing area.

* * * * *